United States Patent [19]

Posluszny et al.

[11] Patent Number: 4,604,574
[45] Date of Patent: Aug. 5, 1986

[54] ROTATING PROBE INDICATING THE ANGLE OF INTERSECTION WITH A SURFACE

[75] Inventors: Thomas Posluszny, Juno Isles; Kevin D. Smith, Palm Beach Gardens; Paul W. Schlie, Lake Worth, all of Fla.

[73] Assignee: United Technologies Corporation, Hartford, Conn.

[21] Appl. No.: 580,505

[22] Filed: Feb. 15, 1984

[51] Int. Cl.⁴ .......................... G01B 7/30; G01B 7/14
[52] U.S. Cl. .................................. 324/207; 318/648; 318/653; 324/225; 324/226; 364/559
[58] Field of Search ............... 324/207, 208, 225, 240, 324/226; 73/661, 1 E, 634; 219/124.22, 124.33, 124.34, 124.4; 318/648, 652, 653, 576, 578; 364/167, 168, 559; 408/13; 901/2, 9, 14, 17; 33/503, 555, 1 N, 1 PT

[56] References Cited

U.S. PATENT DOCUMENTS

| | | | |
|---|---|---|---|
| 2,747,152 | 5/1956 | Greene | 219/124.34 X |
| 3,109,139 | 10/1963 | Branker | 324/240 |
| 3,381,216 | 4/1968 | Sibley, Jr. et al. | 324/207 |
| 3,542,996 | 11/1970 | Bollinger et al. | 219/124.33 X |
| 3,978,714 | 9/1976 | Shraiber et al. | 73/634 X |
| 4,276,503 | 6/1981 | Peiffert et al. | 318/576 |
| 4,282,577 | 8/1981 | Abend et al. | 364/559 X |
| 4,296,306 | 10/1981 | Nomura et al. | 219/124.33 X |
| 4,328,553 | 5/1982 | Fredriksen et al. | 364/559 |
| 4,409,549 | 10/1983 | Garner et al. | 324/262 |
| 4,470,307 | 9/1984 | Genter et al. | 73/634 |
| 4,554,834 | 11/1985 | Prinz et al. | 318/652 X |

Primary Examiner—Gerard R. Strecker
Attorney, Agent, or Firm—Gerald E. Linden

[57] ABSTRACT

The relative orientation of a probe and a surface is maintained by positioning a proximity sensor off-axis on the probe, rotating the probe, and using the signal from the probe to adjust the relative orientation in a feedback loop.

4 Claims, 2 Drawing Figures

4,604,574

ROTATING PROBE INDICATING THE ANGLE OF INTERSECTION WITH A SURFACE

TECHNICAL FIELD

This invention relates to determining the orientation of a surface relative to a probe, especially in the context of automated systems.

BACKGROUND ART

In many fields of endeavor it is important to determine the orientation of a surface with respect to a tool, especially in the field of automated assembly and testing. For instance, certain materials inspection using eddy current techniques require that the eddy current probe be oriented very normal to the inspected part. An industrial robot or numerically controlled machine may have difficulty maintaining the required normal orientation over an entire surface, especially where contours are involved. A jig may be employed to maintain normal orientation, but contacting the surface is not desirable in certain instances. Contacting methods must address wear issues and eddy current signal degradation due to mechanical vibration and heating. Noncontacting methods alleviate these problems. Existing noncontacting methods suffer from poor positional accuracy and such methods as air bearing probes, although providing accurate liftoff (probe to surface distance)compensation, do not guarantee normality and are limited in their surface (geometric) application.

DISCLOSURE OF THE INVENTION

Therefore, objects of this invention include providing for a determination of the orientation of a probe (tool) with respect to a surface, particularly for determining a normal orientation especially for automated systems, and adapted for use with contoured surfaces, using a noncontacting probe.

According to the invention, a sensor rotates about the axis of a probe and provides a signal indicative of the lift-off of the sensor from a surface. When the axis is normal to the surface, the lift-off signal is constant. When the axis is inclined, the lift-off signal varies. By processing the lift-off signal with respect to the sensor's rotational position, an error signal is provided in a feedback loop to an actuator which reorients the probe to maintain the axis normal to the surface. The sensor may be an eddy current sensor and the actuator may be industrial robot.

Other objects, features, and advantages of this invention will become apparent in light of the teachings of the following drawings and detailed description.

BEST MODE FOR CARRYING OUT THE INVENTION

Figure 1:
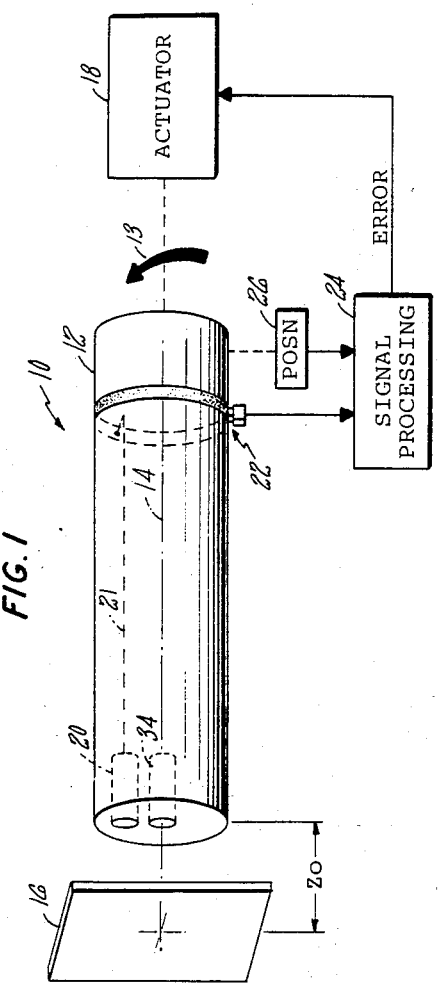
FIG. 1. is a schematic view of the probe of this invention.

In FIG. 1 is shown a probe 10 having a rotating member 12 that rotates as shown by the arrow 13 about an axis 14. The probe 10 is oriented with respect to a flat surface 16 by a servo actuator 18, such as an industrial robot, so that the axis 14 intersects the surface 16. A sensor 20 is disposed off-axis on the rotating member 12 so that it describes a circular path about the axis 14. The sensor 20 is a proximity sensor that is operable to provide a lift-off signal indicative of the instantaneous lift-off ($Z_o$) of the sensor 20 from the surface 16. The lift-off signal is provided on a line 21 via a commutator 22 to a circuit 24, such as a microprocessor, in conjunction with a signal indicative of the instantaneous rotational position (theta) of the rotating member 12 as provided by a suitable position transducer 26.

As used herein, "orientation" refers to the intersecting relationship between the axis 14 and the surface 16, which may be either "normal" (the axis being at 90 degrees to the surface) or "inclined" (the axis being at other than 90 degrees to the surface).

Figure 2:
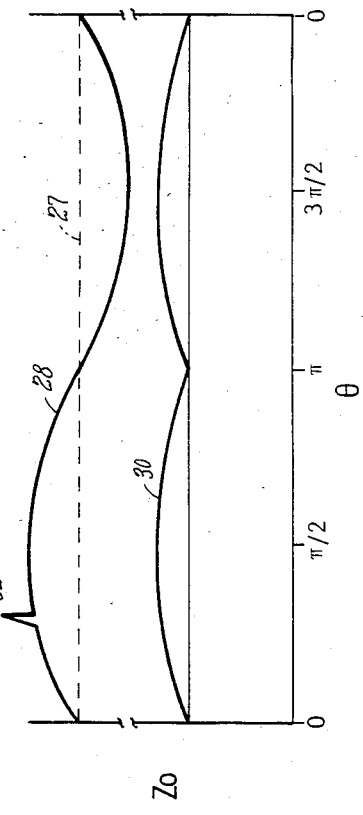
FIG. 2 is a graph relating to the invention.

When the axis 14 is normal to the surface 16, the lift-off signal remains constant for all rotational positions of the rotating member 12. Therefore, as shown in FIG. 2, the lift-off signal, shown by a broken line 27, remains constant for all thetas. However, when the axis 14 is inclined to the surface 16, the lift-off signal varies with theta, as shown by a solid line 28.

Referring again to FIG. 1, the circuit 24 provides an error signal to the servo actuator 18 based on the variation of the lift-off signal in the "inclined" case. The error signal is provided to the actuator 18 in a feedback loop so that the normality of the probe to the surface can be maintained. It should be understood that the circuit 24 may be modeled (or programmed) so that an inclined (other than normal) orientation is maintained. It should also be understood that the probe could be fixed in orientation (yet still rotating), and the surface orientation adjusted by the actuator 18 so that a particular orientation is maintained.

The case for maintaining an orientation relative to a contoured surface is similar, except that the lift-off signal may vary even though the probe is normal to the surface. Consider the case of a cylindrical surface with the probe axis aligned along the radius of curvature. The lift-off signal would vary as shown by the line 30 in FIG. 2. For this particular case there is a symmetry associated with probe normality, wherein the lift-off signal for any theta equals the lift-off signal for theta plus pi radians. To maintain normality, the circuit 18 would need to be modeled (programmed) so that the orientation is driven towards achieving that symmetry. It should be understood that many other surface configurations are possible, for which calculation and detection of the lift-off signal relating to normality is straightforward. As a practical matter for certain concave contours the probe size may dictate a minimum liftoff for nonimpingement with the surface, and that minimum liftoff may limit the sensitivity of the sensor.

The sensor 20 is typically an eddy current sensor, the impedance of which varies with lift-off. The impedance also varies in response to material inhomogeneities and flaws in the surface, an effect which must be accounted for. For instance, a spike 32 in the lift-off signal 28 of FIG. 2 might indicate a flaw on or near the surface 16. But, having no relevance to a determination of orientation, the spike 32 could be filtered out by the circuit 18.

The probe 10 has an element 34 disposed on the axis 14 to rotate with the probe. The position of the element 34 remains "fixed" since it is on-axis. The element 34 may be the probe of an eddy current flaw detector. Signals are provided to and from the element 34 by a commutator (not shown). The element 34 may also be a tool, such as a drill. Irrespective of what the element 34 is, its orientation is fixed with respect to the probe, so that probe orientation (relative to a surface) is indicative of element orientation (relative to the surface), even in the case where the element 34 is external to the probe. The ability to maintain a particular orientation of the element 34 with respect to a surface makes this invention useful for automated systems.

Although the invention has been described with respect to a particular embodiment, it should be understood that various changes could be made thereto without departing from the spirit and scope of the invention.

What is claimed is:

1. Apparatus indicating the angle of intersection between the axis (14) of a rotating member (12) and a surface (16), comprising:
   a rotating member (12) having an axis (14) of rotation;
   a sensor (20), disposed off-axis on the rotating member, for providing a lift-off signal indicative of the instantaneous lift-off of the sensor from the surface;
   means (26) for providing a theta signal indicative of the instantaneous rotational position of the sensor with respect to the axis;
   means (24) for providing an orientation signal indicative of the intersection angle between the axis and the surface in response to the lift-off signal and the theta signal.

2. Apparatus according to claim 1 further comprising an element for performing an operation on the surface, the element disposed on-axis on the rotating member.

3. Apparatus according to claim 2 wherein the operation is eddy current flaw detection.

4. Apparatus according to claim 1, further comprising:
   means (18) for adjusting the intersection angle between the axis of the rotating member and the surface in response to the orientation signal.

* * * * *